US009995973B2

(12) United States Patent
Shin et al.

(10) Patent No.: US 9,995,973 B2
(45) Date of Patent: Jun. 12, 2018

(54) LIQUID CRYSTAL DISPLAY DEVICE

(71) Applicant: Samsung Display Co., Ltd., Yongin-Si, Gyeonggi-Do (KR)

(72) Inventors: Dong-Chul Shin, Seoul (KR); Oh Jeong Kwon, Hwaseong-si (KR); Su Jin Kim, Seoul (KR); Jin Won Kim, Suwon-si (KR); Dong Han Song, Hwaseong-si (KR); Ki Chul Shin, Seongnam-si (KR); Sung-Jae Yun, Hwaseong-si (KR); Hyeok Jin Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 159 days.

(21) Appl. No.: 14/975,046

(22) Filed: Dec. 18, 2015

(65) Prior Publication Data

US 2016/0216574 A1    Jul. 28, 2016

(30) Foreign Application Priority Data

Jan. 26, 2015 (KR) .................. 10-2015-0012376

(51) Int. Cl.
*G02F 1/1343* (2006.01)
*G02F 1/1337* (2006.01)

(52) U.S. Cl.
CPC ...... *G02F 1/134309* (2013.01); *G02F 1/1343* (2013.01); *G02F 1/13439* (2013.01); *G02F 1/133707* (2013.01)

(58) Field of Classification Search
CPC .......... G02F 1/13439; G02F 1/134309; G02F 1/133345; G02F 1/133707
See application file for complete search history.

(56) References Cited

U.S. PATENT DOCUMENTS 8,304,039 B2    11/2012  Oh et al.
9,298,032 B2 *   3/2016  Jung ................ G02F 1/133512
9,599,867 B2 *   3/2017  Kang ................. H01L 27/1259

FOREIGN PATENT DOCUMENTS

KR    10-2010-0032324    3/2010
KR    10-2012-0031801    4/2012
KR    10-2012-0074967    7/2012

* cited by examiner

*Primary Examiner* — Dung Nguyen
(74) *Attorney, Agent, or Firm* — Innovation Counsel LLP

(57) ABSTRACT

A display device may include a common electrode, a first pixel electrode, a second pixel electrode, an insulation layer, and a liquid crystal layer. The first pixel electrode overlaps the common electrode. The second pixel electrode is electrically connected to the first pixel electrode and is positioned between the first pixel electrode and the common electrode. A first portion of the second pixel electrode does not overlap the first pixel electrode in a direction perpendicular to the common electrode. A second portion of the second pixel electrode overlaps a first portion of the first pixel electrode. A second portion of the first pixel electrode does not overlap the second pixel electrode in the direction perpendicular to the common electrode. The insulating layer is positioned between the first pixel electrode and the second pixel electrode. The liquid crystal layer is positioned between the common electrode and the second pixel electrode.

20 Claims, 13 Drawing Sheets

LIQUID CRYSTAL DISPLAY DEVICE

CROSS-REFERENCE TO RELATED APPLICATION

This application claims priority to and the benefit of Korean Patent Application No. 10-2015-0012376 filed in the Korean Intellectual Property Office on Jan. 26, 2015; the entire contents of the Korean Patent Application are incorporated herein by reference.

BACKGROUND (a) Technical Field

The technical field is related to a liquid crystal display device (or liquid crystal display for conciseness).

(b) Description of Related Art

A liquid crystal display device (or liquid crystal display) may include two panels with field generating electrodes, such as a pixel electrode and a common electrode, and may include a liquid crystal layer interposed between the two panels. Voltages may be applied to the field generating electrodes to generate an electric field in the liquid crystal layer. Orientations of liquid crystal molecules of the liquid crystal layer may be determined by the electric field to control transmission of incident light. Therefore, images may be displayed.

The above information disclosed in this Background section is for enhancement of understanding of a background related to the invention. The Background section may contain information that does not form the prior art that is already known in this country to a person of ordinary skill in the art.

SUMMARY

Some features may be described based on a plan view associated with a described device without explicitly referring to the plan view.

An embodiment may be related to a display device. The display device may include a common electrode, a first pixel electrode, a second pixel electrode, an insulating layer, and a liquid crystal layer. The first pixel electrode may overlap the common electrode, may include a plate electrode, and may include first-set branch electrodes that are directly connected to the plate electrode. The second pixel electrode may be electrically connected to the first pixel electrode, partially may overlap the first pixel electrode, and may be positioned between the first pixel electrode and the common electrode. The insulating layer may be positioned between the first pixel electrode and the second pixel electrode. The liquid crystal layer may be positioned between the common electrode and a combination of the first pixel electrode and the second pixel electrode. In a plan view associated with the display device, a ratio of an area of the plate electrode to areas of the first pixel electrode and the second pixel electrode may be in a range of about 25% to about 60%.

The first-set branch electrodes may include first-group first-set branch electrodes and second-group first-set branch electrodes. The first-group first-set branch electrodes may be aligned with the second-group first-set branch electrodes in the plan view. The first-group first-set branch electrodes may be directly connected to a first side of the plate electrode. The second-group first-set branch electrodes may be directly connected to a second side of the plate electrode. The first side of the plate electrode may be parallel to the second side of the plate electrode in the plan view.

The display device may include a transistor. A drain electrode may be electrically connected through the first pixel electrode to the second pixel electrode.

The second pixel electrode may include a first stem electrode and a first second-set branch electrode. The first stem electrode may partially overlap the plate electrode. The first-second branch electrode may be directly connected to the first stem electrode and may be oriented at an acute angle with respect to the first stem electrode in the plan view. A first portion of the first second-set branch electrode may overlap the plate electrode. A second portion of the first second-set branch electrode may not overlap the plate electrode in a direction perpendicular to the plate electrode.

The first-set branch electrodes may not overlap the second pixel electrode in the direction perpendicular to the plate electrode.

The second portion of the first second-set branch electrode may be positioned at a hole surrounded by the plate electrode in the plan view.

The second pixel electrode may include a protrusion. The protrusion may protrude from a center portion of the first stem electrode and may directly contact the first pixel electrode through a contact hole of the insulating layer.

The first pixel electrode may include a connecting bar. The connecting bar may be positioned between two holes of the first pixel electrode and may be surrounded by the plate electrode.

Each of the two holes of the first pixel electrode may have an isosceles triangle shape.

A first portion of the plate electrode may overlap the second pixel electrode. A second portion of the plate electrode may not overlap the second pixel electrode in a direction perpendicular to the plate electrode. The first-set branch electrodes may not overlap the second pixel electrode in the direction perpendicular to the plate electrode. The second portion of the plate electrode may surround the first portion of the plate electrode in the plan view.

An embodiment may be related to a display device. The display device may include a common electrode, a first pixel electrode, a second pixel electrode, an insulation layer, and a liquid crystal layer. The first pixel electrode may overlap the common electrode. The second pixel electrode may be electrically connected to the first pixel electrode and may be positioned between the first pixel electrode and the common electrode. A first portion of the second pixel electrode may not overlap the first pixel electrode in a direction perpendicular to the common electrode. A second portion of the second pixel electrode may overlap a first portion of the first pixel electrode. A second portion of the first pixel electrode may not overlap the second pixel electrode in the direction perpendicular to the common electrode. The insulating layer may be positioned between the first pixel electrode and the second pixel electrode. The liquid crystal layer may be positioned between the common electrode and a combination of the first pixel electrode and the second pixel electrode.

The second portion of the second pixel electrode may surround the first portion of the second pixel electrode in a plan view associated with the display device.

The second portion of the first pixel electrode may surround the first portion of the first pixel electrode in a plan view associated with the display device.

The first portion of the second pixel electrode may be positioned at a hole of the first pixel electrode in a plan view associated with the display device. The hole may be surrounded by the first portion of the first pixel electrode in the plan view. The hole may have an isosceles triangle shape in the plan view.

A protrusion of the second pixel electrode may extend through a contact hole of the insulating layer and may directly contact a center portion of the first pixel electrode.

An embodiment may be related to a display device. The display device may include a common electrode, a first pixel electrode, a second pixel electrode, an insulation layer, and a liquid crystal layer. The first pixel electrode may overlap the common electrode, may include a plate electrode, and may include a plurality of branch electrodes. The plurality of branch electrodes may include first-group branch electrodes, second-group branch electrodes, third-group branch electrodes, and fourth-group branch electrodes. The first-group branch electrodes may be directly connected to a first side of the plate electrode. The second-group branch electrodes may be directly connected to a second side of the plate electrode. The third-group branch electrodes may be directly connected to a third side of the plate electrode. The fourth-group branch electrodes may be directly connected to a fourth side of the plate electrode. The second pixel electrode may be electrically connected to the first pixel electrode and may be positioned between the first pixel electrode and the common electrode. The plate electrode may partially overlap the second pixel electrode. The plurality of branch electrodes may not overlap the second pixel electrode in a direction perpendicular to the common electrode. The insulating layer may be positioned between the first pixel electrode and the second pixel electrode. The liquid crystal layer may be positioned between the common electrode and a combination of the first pixel electrode and the second pixel electrode.

The second pixel electrode may be positioned between the first-group branch electrodes and the third-group branch electrodes in a plan view associated with the display device. The second pixel electrode may be positioned between the second-group branch electrodes and the fourth-group branch electrodes in the plan view.

The first side of the plate electrode may be directly connected to a first end of a fifth side of the plate electrode. The second side of the plate electrode may be directly connected to a second end of the fifth side of the plate electrode.

An embodiment may be related to a liquid crystal display device (or liquid crystal display for conciseness). The liquid crystal display may include the following elements: a first substrate; a pixel electrode formed on the first substrate to include a first electrode and a second electrode which are disposed to overlap each other with an insulating layer being positioned between the first electrode and the second electrode; a second substrate, which overlaps the first substrate; a common electrode formed on the second substrate; and a liquid crystal layer positioned between the first substrate and the second substrate, wherein the first electrode includes a plate portion and a first plurality of branch electrodes, which extends from the plate portion, the second electrode includes a second plurality of branch electrodes, and a ratio of an area of the plate portion of the first electrode to areas of the first electrode and the second electrode of the pixel electrode is in a range of about 25% to about 60%.

The liquid crystal display may be curved and may have a geometric curvature radius. The geometric curvature radius may be perpendicular to a direction in which a gate line or a date line extends.

The first electrode and the second electrode may be connected to each other through a contact hole formed in the insulating layer.

The first electrode may be disposed below the insulating layer, the second electrode may be disposed on the insulating layer, and a part of the plate portion of the first electrode may overlap the second branch electrodes of the second electrode.

A pixel area of the liquid crystal display may include: a first region at which the branch electrodes of the first electrode is disposed; a second region at which the plate portion of the first electrode and a first portion of the branch electrodes of the second electrode overlap each other; and a third region at which a second portion of the branch electrodes of the second electrode are disposed.

A ratio of an intensity of an electric field applied to a portion of the liquid crystal layer at the third region to an intensity of an electric field applied to a portion of the liquid crystal layer at the first region may be in a range of about 0.3 to about 0.9.

According to embodiments, in a liquid crystal display, a common electrode may be continuous without significant holes or cutouts. Advantageously, even if misalignment exists between the common electrode and pixel electrodes the liquid crystal display, substantially consistent and/or satisfactory image quality may still be attained.

According to embodiments, in a liquid crystal display, each pixel area may have a plurality of domains associated with different luminance levels. Advantageously, satisfactory image quality and/or a satisfactory viewing angle may be attained.

DETAILED DESCRIPTION OF EMBODIMENTS

Figure 1:
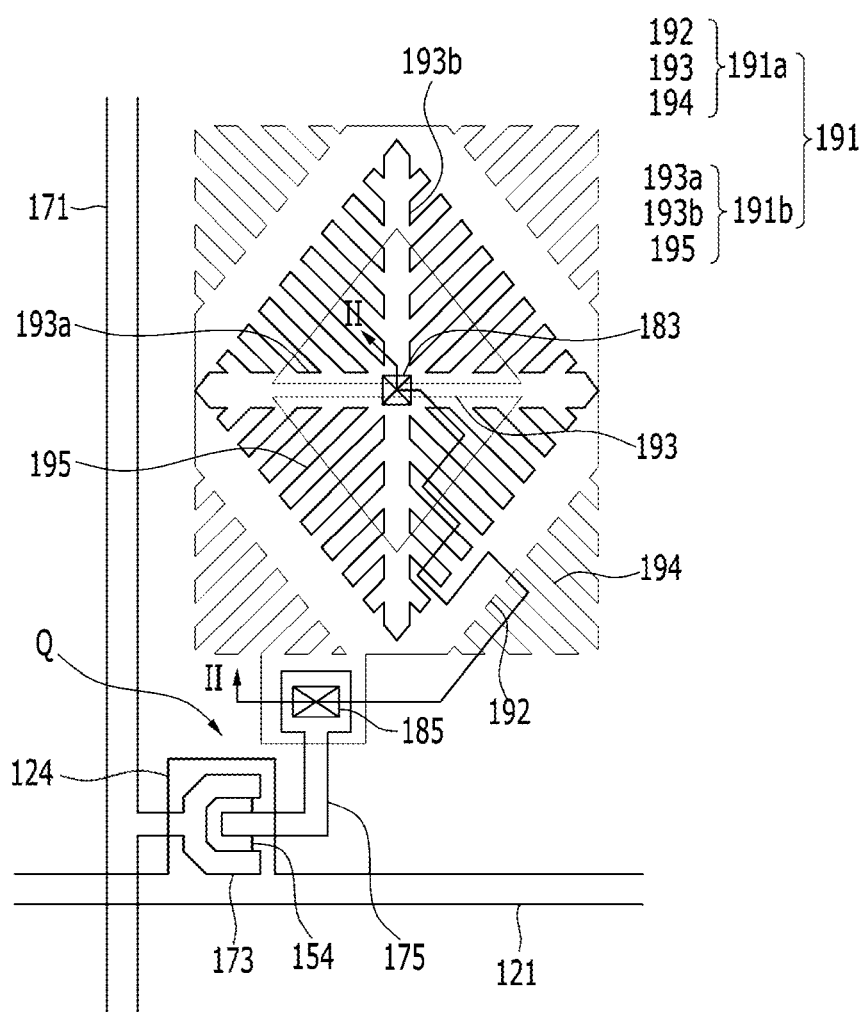
FIG. 1 is a schematic (top) plan view illustrating elements and/or structures in a liquid crystal display device (or liquid crystal display) according to an embodiment.

Some embodiments are described with reference to the accompanying drawings. As those skilled in the art would realize, the described embodiments may be modified in various ways.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

In the drawings, thicknesses of layers, films, panels, regions, etc., may be exaggerated for clarity. Like reference numerals may designate like elements. When a first element (such as a layer, film, region, or substrate) is referred to as being "on" a second element, the first element can be directly on the second element, or one or more intervening elements may also be present. When a first element is referred to as being "directly on" a second element, there are no intended intervening elements provided between the first element and the second element.

The term "connect" may mean "electrically connect". The term "insulate" may mean "electrically insulate". The phrase "formed on" may mean "formed, provided, and/or positioned on".

A drawing and related description may use a particular position and/or orientation of a device as an example. The device may have various positions and/or orientations.

A drawing may represent a plan view projected on a plane. Some curved elements and/or some curved structures may appear flat and/or straight in the plan view. Some elements, structures, and/or features may be described based on the plan view without explicitly referring to or reciting the plan view.

Figure 2:
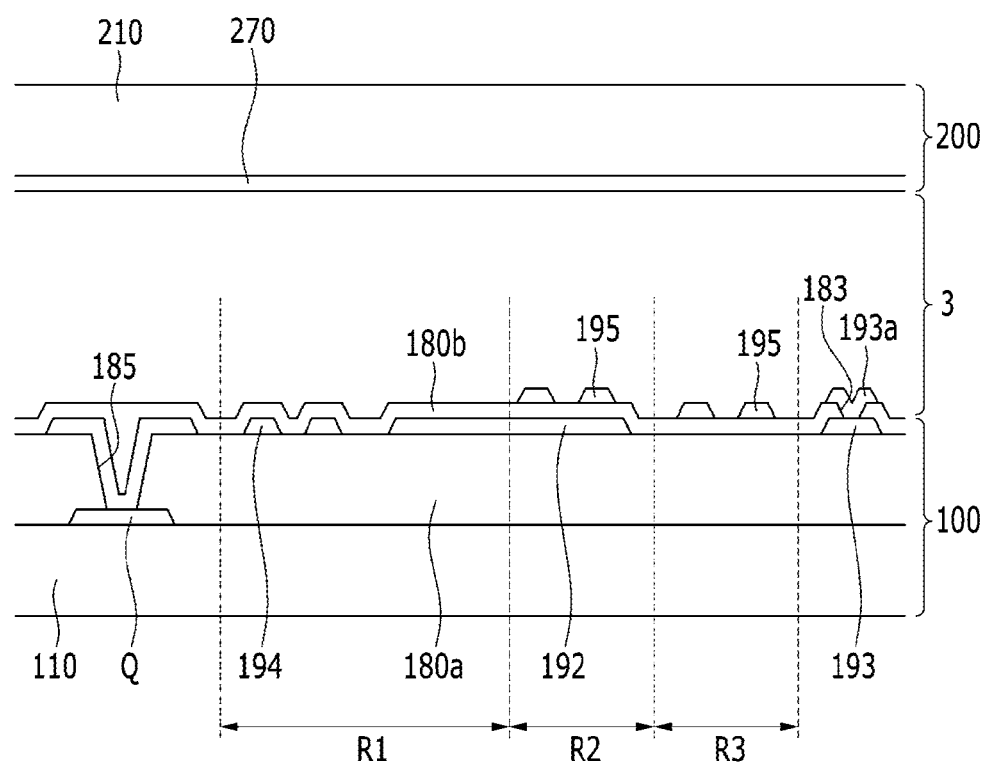
FIG. 2 is a schematic cross-sectional view illustrating elements and/or structures in the liquid crystal display shown in FIG. 1 according to an embodiment.
Figure 3:
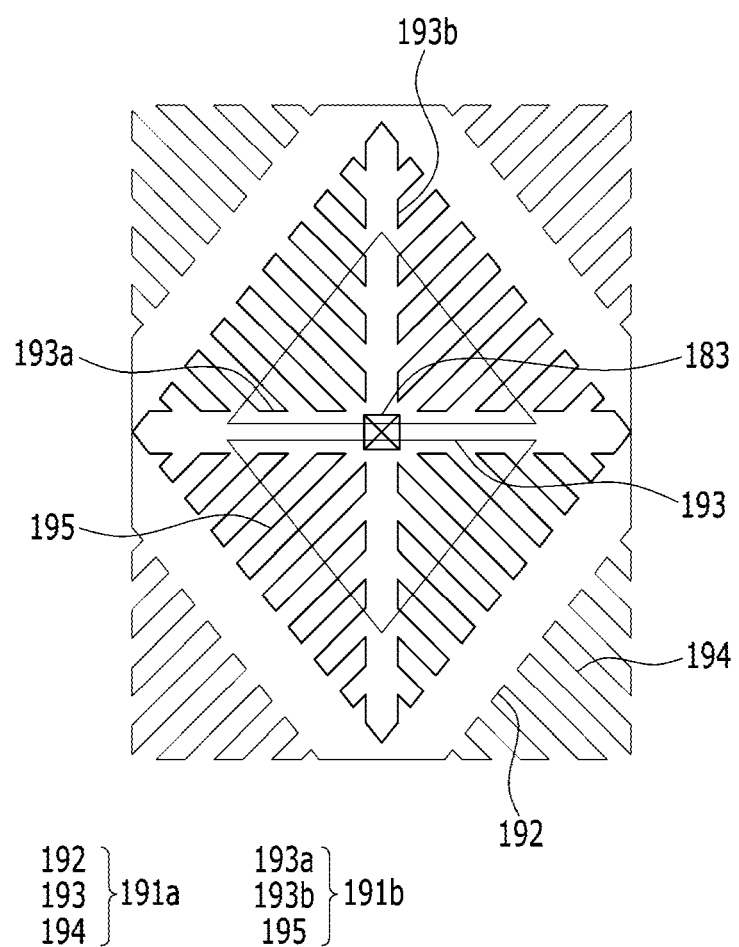
FIG. 3 is a schematic (top) plan view illustrating elements and/or structures in a pixel electrode set of the liquid crystal display shown in FIG. 1 according to an embodiment.
Figure 4:
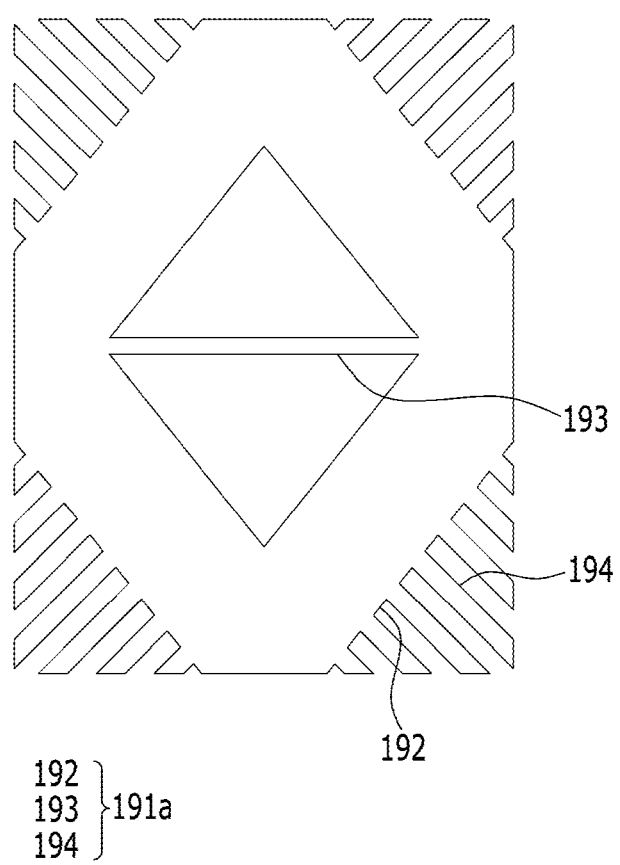
FIG. 4 is a schematic (top) plan view illustrating elements and/or structures in a lower electrode of the pixel electrode set shown in FIG. 3 according to an embodiment.
Figure 5:
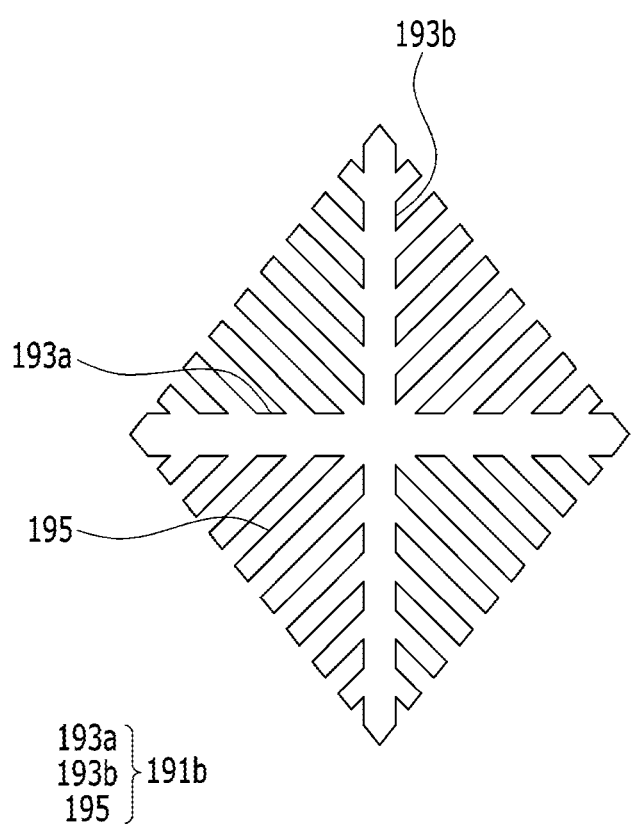
FIG. 5 is a schematic (top) plan view illustrating elements and/or structures in an upper electrode of the pixel electrode set shown in FIG. 3 according to an embodiment.

FIG. 1 is a schematic (top) plan view illustrating elements and/or structures in a liquid crystal display device (or liquid crystal display for conciseness) according to an embodiment. FIG. 2 is a schematic cross-sectional view illustrating elements and/or structures in the liquid crystal display shown in FIG. 1 according to an embodiment. FIG. 3 is a schematic (top) plan view illustrating elements and/or structures in a pixel electrode set 191 of the liquid crystal display shown in FIG. 1 according to an embodiment. FIG. 4 is a schematic (top) plan view illustrating elements and/or structures in a lower electrode 191a of the pixel electrode set 191 shown in FIG. 3 according an embodiment. FIG. 5 is a schematic (top) plan view illustrating elements and/or structures in an upper electrode 191b of the pixel electrode set 191 shown in FIG. 3 according to an embodiment.

Referring to FIG. 1 and FIG. 2, the liquid crystal display includes a first panel 100 (e.g., lower panel 100), a second panel 200 (e.g., upper panel 200), and a liquid crystal layer 3 interposed between the two panels 100 and 200. The lower panel 100 may include a first substrate 110 and may include some elements that are positioned on the first substrate 110. A gate line 121 including (or connected to) a gate electrode 124 is formed on the first substrate 110. The gate line 121 serves to transmit a gate signal. The gate line 121 substantially extends in a first direction (e.g., horizontal direction).

A gate insulating layer (not shown) is formed on the gate line 121. A semiconductor 154, which may be made of hydrogenated amorphous silicon, polysilicon, or an oxide, is disposed on the gate insulating layer.

A source electrode 173 and a drain electrode 175 are formed on the semiconductor 154 and the gate insulating layer.

A data line 171 may transmit data voltages. The data line 171 extends in a second direction (e.g., vertical direction) and intersects the gate line 121. The data line 171 includes (or is connected to) the source electrode 173, which may overlap the gate electrode 124.

The drain electrode 175 is separated from the data line 171 and includes a portion facing the source electrode 173.

The gate electrode 124, the source electrode 173, the drain electrode 175, and the semiconductor 154 constitute a thin film transistor (TFT) Q.

A first passivation layer 180a (or first insulating layer 180a) is disposed on the thin film transistor Q. The first passivation layer 180a may be made of an insulating material. The first passivation layer 180a has a contact hole 185 for exposing the drain electrode 175.

A first-type pixel electrode 191a (e.g., lower electrode 191a) of a pixel electrode set 191 (or pixel electrode 191 for conciseness) is formed on the first passivation layer 180a. A second passivation layer 180b (or second insulating layer 180b) is formed on the lower electrode 191a. A second contact hole 183 is formed on the second passivation layer 180b to partially expose the lower electrode 191a.

A second-type pixel electrode 191b (e.g., upper electrode 191b) of the pixel electrode 191 is formed on the second passivation layer 180b.

The lower electrode 191a of a pixel electrode 191 is connected to the drain electrode 175 of the thin film transistor Q through the first contact hole 185. The upper electrode 191b of the pixel electrode 191 is connected to the lower electrode 191a of the pixel electrode through the second contact hole 183.

The pixel electrode 191 may be made of a transparent conductive material (such as ITO or IZO) or a reflective metal (such as aluminum, silver, chromium, or an alloy of two or more of these metal materials).

The pixel electrode 191 may receive a data voltage through the thin film transistor Q, which may be controlled by a gate signal received at the gate electrode 124.

Referring to FIG. 3 and FIG. 4, the lower electrode 191a of the pixel electrode 191 of the liquid crystal display includes a horizontal connector 193 (or connecting bar 193) positioned at the center of the lower electrode 191a and extending in the first direction (or horizontal direction). The lower electrode 191a includes a substantially plate portion 192 that may have a substantially octagonal shape and may be a combination of the horizontal connector 193 and four parallelogram portions. The four parallelogram portions may be positioned around the horizontal connector 193 and may surround the horizontal connector 193. The plate portion 192 may have two holes. The connector 193 may be positioned between the two holes. Each of the two holes may have a triangular shape (e.g., an isosceles triangle shape). The lower electrode 191a includes a plurality of first-set branch electrodes 194 (or first branch electrodes 194 for conciseness) extending from the plate portion 192. The first branch electrodes 194 may extend from four sides of the plate portion 192. The first branch electrodes 194 may extend at acute angles greater than 60 degrees with respect to the four sides of the plate portion 192 or perpendicular to the four sides of the plate portion 192.

Referring to FIG. 3 and FIG. 5, the upper electrode 191b of the pixel electrode 191 of the liquid crystal display is disposed at a center of the pixel electrode 191. An outline that connects the outermost edges of the upper electrode 191b may have a substantially rhombus shape.

The upper electrode 191b of the pixel electrode 191 includes a first-type stem 193a (e.g., horizontal stem 193a), a second-type stem 193b (e.g., vertical stem 193b) extending perpendicular to the first-type stem 193a, and a plurality of second-set branch electrodes 195 (or second branch electrodes 195) extending from the stems 193a and 193b. The second branch electrodes 195 may extend at acute angles with respect to the stems 193a and 193b.

A part (e.g., inner part) of the plate portion 192 of the lower electrode 191a of the pixel electrode 191 may overlap the second branch electrodes 195 of the upper electrode 191b of the pixel electrode 191.

An area of the plate portion 192 of the lower electrode 191a of the pixel electrode 191 may be greater than or equal to 27% of areas of the lower electrode 191a and the upper electrode 191b of the pixel electrode 191.

Each of the first branch electrodes 194 and the second branch electrodes 195 may be divided into four groups by the stems 193a and 193b. The pixel electrode 191 may be divided into four sub-regions that respectively correspond to the four groups of the first branch electrodes 194 and the four groups of the second branch electrodes 195. Branch electrodes of a first group of the first branch electrodes 194 may be parallel to and/or aligned with branch electrodes of a first group of the second branch electrodes 195, branch electrodes of a second group (e.g., an opposite group) of the first branch electrodes 194, and/or branch electrodes of a second group of the second branch electrodes 195 in a plan view of the liquid crystal display. Branch electrodes of a third group of the first branch electrodes 194 may be parallel to and/or aligned with branch electrodes of a third group of the second branch electrodes 195, branch electrodes of a fourth group (e.g., an opposite group) of the first branch electrodes 194, and/or branch electrodes of a fourth group of the second branch electrodes 195 in the plan view of the liquid crystal display.

In a plan view of the liquid crystal display, the first branch electrodes 194 and the second branch electrodes 195 of a sub-region disposed at the upper left side among the four sub-regions may extend obliquely from a first side of the plate portion 192 or a central portion of the pixel electrode 191 toward two edges of the pixel electrode 191 in the upper left direction, the first branch electrodes 194 and the second branch electrodes 195 of a sub-region disposed at the upper right side may extend obliquely from a second side of the plate portion 192 or a central portion of the pixel electrode 191 toward two edges of the pixel electrode 191 in the upper right direction, the first branch electrodes 194 and the second branch electrodes 195 of a sub-region disposed at the lower left side may extend obliquely from a third side of the plate portion 192 or a central portion of the pixel electrode 191 toward two edges of the pixel electrode 191 in the lower left direction, and the first branch electrodes 194 and the second branch electrodes 195 of a sub-region disposed at the lower right side may extend obliquely from a fourth side of the plate portion 192 or a central portion of the pixel electrode 191 toward two edges of the pixel electrode 191 in the lower right direction.

Referring to FIG. 2, the upper panel 200 may include a common electrode 270 formed on a second substrate 210.

In an embodiment, a color filter and a light blocking member may be formed on the second substrate 210. In an embodiment, and at least one of a color filter and a blocking member may be formed on the first substrate 110.

The pixel area of the liquid crystal display may include a first region R1, a second region R2, and a third region R3. In the first region R1, the first branch electrodes 194a and a first portion of the plate portion of the lower electrode 191a are present, and no portion of the upper electrode 191b is present. In the second region R2, a second portion of the plate portion 192 of the lower electrode 191a of the pixel electrode 191 overlap a first portion of the second branch electrodes 195 of the upper electrode 191b of the pixel electrode 191. In the third region R3, a second portion of the second branch electrodes 195 of the upper electrode 191b of the pixel electrode 191 are is present, and no portion of the lower electrode 191a is present.

Since the lower electrode 191a of the pixel electrode 191 is disposed below the second passivation layer 180b, a distance from the common electrode 270 to the lower electrode 191a is relatively large; and since the upper electrode 191b of the pixel electrode 191 is disposed on the second passivation layer 180b, a distance from the common electrode 270 to the upper electrode 191b is relatively small. The intensity of an electric field applied to the liquid crystal 3 is inversely proportional to the distances between portions of the pixel electrode 191 and the common electrode 270. The intensity of an electric field formed at a continuous part may be stronger than the intensity of an electric field formed at a discrete part that includes a plurality of branch electrodes.

Regarding the regions R1, R2, and R3, the weakest electric field is applied to the portion of the liquid crystal layer disposed at the first region R1, while the strongest electric field is applied to the portion of the liquid crystal layer disposed at the second region R2. The intensity of the electric field applied to the portion of the liquid crystal layer disposed at the third region R3 is greater than the intensity of the electric field applied to the portion of the liquid crystal layer disposed at the first region R1 and is smaller than the intensity of the electric field applied to the portion of the liquid crystal layer disposed at the second region R2.

A ratio of the intensity of the electric field of the first region R1 to the intensity of the electric field of the third region R3 may be configured by configuring a thickness and/or an insulation rate of the second passivation layer 180b. In an embodiment, the ratio may be in a range of about 0.3 to about 0.9.

According to embodiments, each pixel area of a liquid crystal display may be divided into three regions (or three domains) based on a structure of an associated pixel electrode set, such that electric fields respectively applied to three portions of a liquid crystal layer positioned at the three regions may have three different intensities. Accordingly, liquid crystal molecules in the three portions of the liquid crystal layer may be inclined at different angles, such that different levels of luminance at the three regions of one pixel area may be attained. Therefore, transmittance at a side portion of the liquid crystal display may approximate transmittance at a center portion of the liquid crystal display. Advantageously, satisfactory image quality and/or a satisfactory viewing angle associated with the liquid crystal display may be attained.

According to embodiments, the three domains are implemented using the structure of the pixel electrode 191 without requiring cutouts in the common electrode 270. Advantageously, even if there is misalignment between the pixel electrode 191 and the common electrode 270, consistent and/or satisfactory image quality may be attained.

Figure 6:
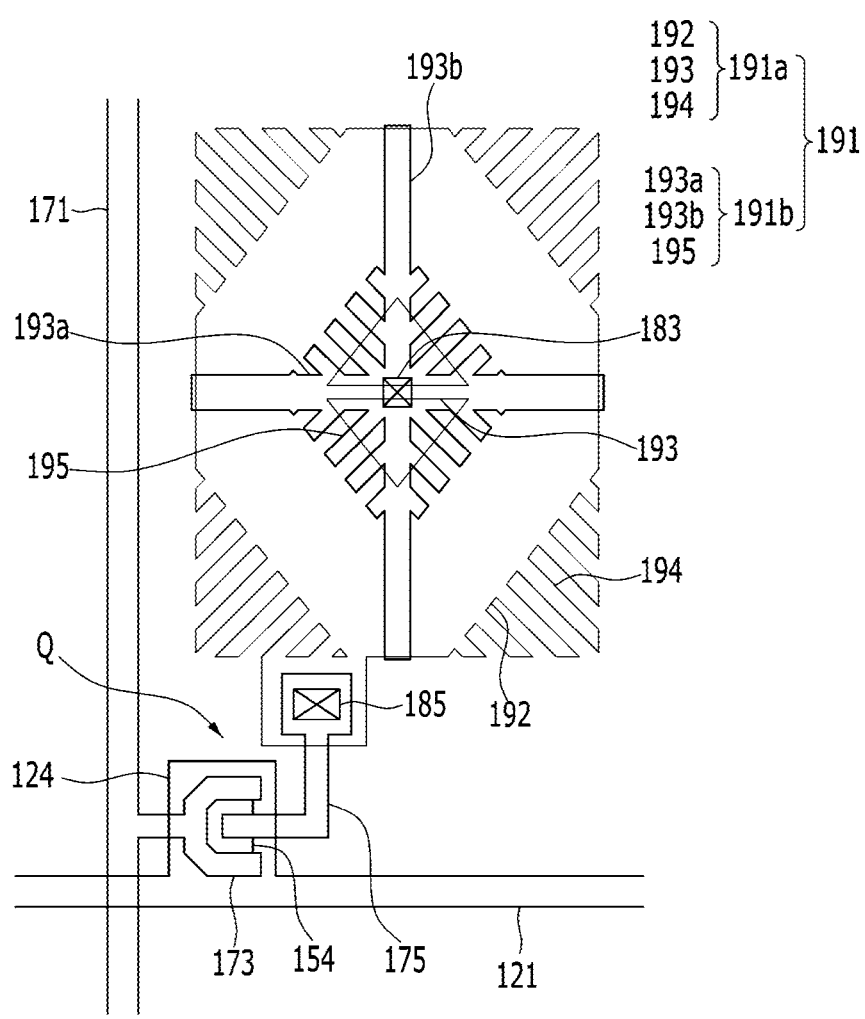
FIG. 6 is a schematic (top) plan view illustrating elements and/or structures in a liquid crystal display according to an embodiment.
Figure 7:
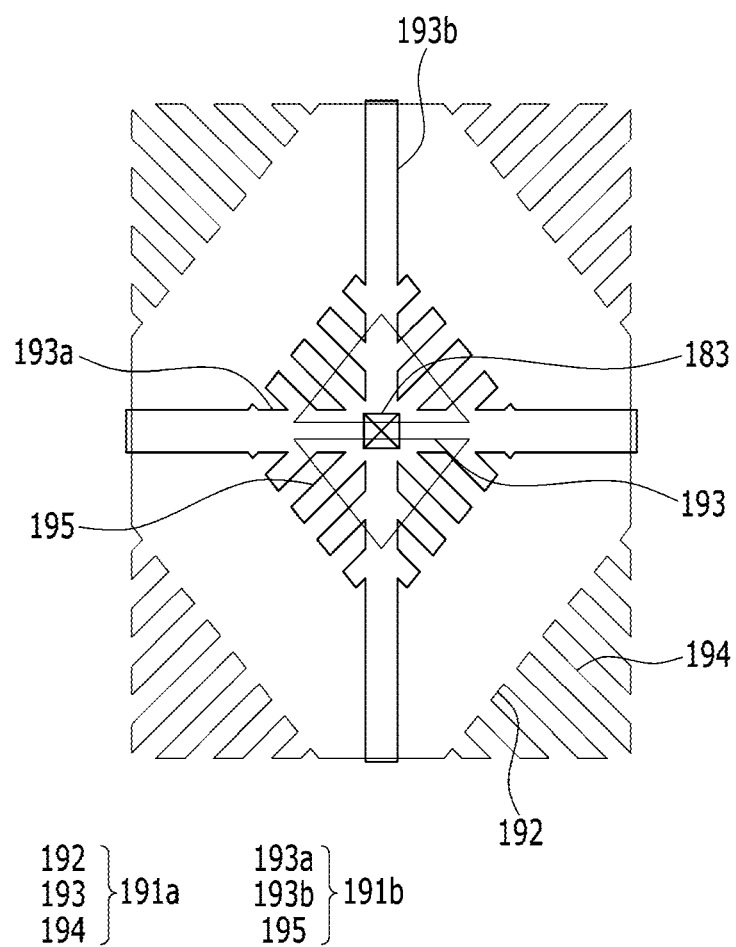
FIG. 7 is a schematic (top) plan view illustrating elements and/or structures in a pixel electrode set of the liquid crystal display shown in FIG. 6 according to an embodiment.
Figure 8:
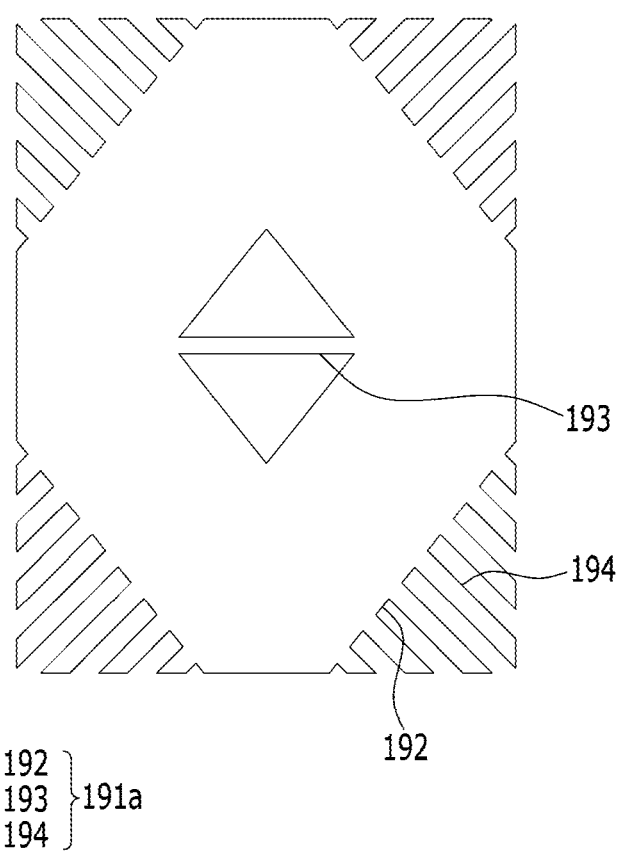
FIG. 8 is a schematic (top) plan view illustrating elements and/or structures in a lower electrode of the pixel electrode set shown in FIG. 7 according to an embodiment.
Figure 9:
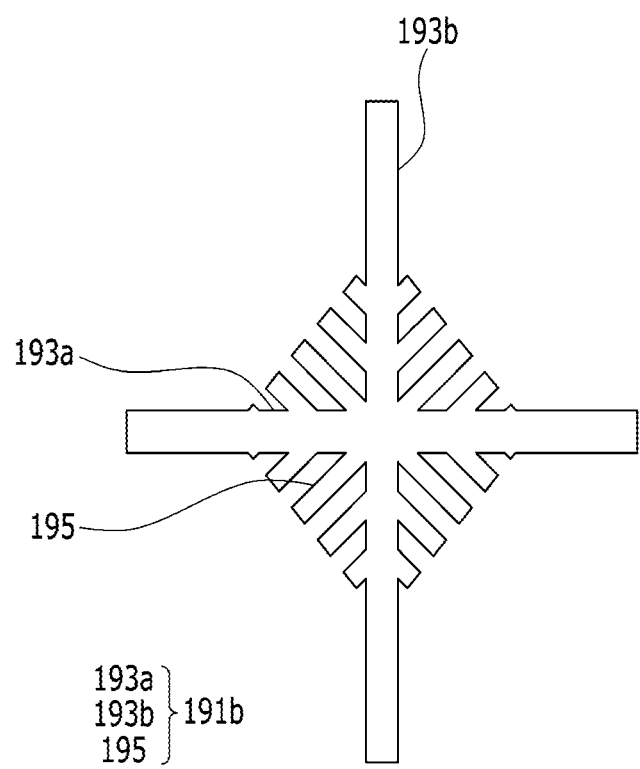
FIG. 9 is schematic (top) plan view illustrating elements and/or structures in an upper electrode of the pixel electrode set shown in FIG. 7 according to an embodiment.

FIG. 6 is a schematic (top) plan view illustrating elements and/or structures in a liquid crystal display according to an embodiment. FIG. 7 is a schematic (top) plan view illustrating elements and/or structures in a pixel electrode set 191 of the liquid crystal display shown in FIG. 6 according to an embodiment. FIG. 8 is a schematic (top) plan view illustrating elements and/or structures in a lower electrode 191*a* of the pixel electrode set 191 shown in FIG. 7 according to an embodiment. FIG. 9 is a schematic (top) plan view illustrating elements and/or structures in an upper electrode 191*b* of the pixel electrode set 191 shown in FIG. 7 according to an embodiment. Some features of the liquid crystal display associated with FIG. 6, FIG. 7, FIG. 8, and FIG. 9 may be analogous to or identical to some of the above-discussed features of the liquid crystal display according associated with FIG. 1, FIG. 2, FIG. 3, FIG. 4, and FIG. 5. Description of analogous features and/or identical features may not be repeated.

Referring to FIG. 3, FIG. 4, FIG. 7, and FIG. 8, some features of the lower electrode 191*a* associated with FIG. 7 and FIG. 8 may be analogous to or identical to some of the above-discussed features of the lower electrode 191*a* associated with FIG. 3 and FIG. 4. In an embodiment, referring to FIG. 7 and FIG. 8, an area of the plate portion 192 of the lower electrode 191*a* of the pixel electrode 191 may be less than or equal to 58% of areas of the lower electrode 191*a* and the upper electrode 191*b* of the pixel electrode 191.

Referring to FIG. 3, FIG. 5, FIG. 7, and FIG. 9, some features of the upper electrode 191*b* associated with FIG. 7 and FIG. 9 may be identical to some of the above-discussed features of the upper electrode 191*b* associated with FIG. 3 and FIG. 5.

Referring to FIG. 7 and FIG. 9, the upper electrode 191*b* includes a horizontal stem 193*a*, a vertical stem 193*b*, and a plurality of second branch electrodes 195 extended from portions of the stems 193*a* and 193*b* near the center of the upper electrode 191*b*. No branch electrodes 195 may extend from outer portions of the stems 193*a* and 193*b* that are positioned relatively farther from the center of the upper electrode 191*b*. Each of the two outer portions of the stem 193*a* may be greater than ¼ of the stem 193*a*. Each of the two outer portions of the stem 193*b* may be greater than ⅙ of the stem 193*a*. Each of the second branch electrodes 195 may partially overlap the plate portion 192 without completely overlapping the plate portion 192. A first portion of a second branch electrode 195 may overlap the plate portion 192, a second portion of the second branch electrode 195 may not overlap the plate portion 192 in a direction perpendicular to the plate portion 192, and the first portion of the second branch electrode 195 may be less than or equal to 80% of the second branch electrode 195.

Referring to FIG. 6, FIG. 7, FIG. 8, and FIG. 9, according to an embodiment, an area of the plate portion 192 of the lower electrode 191*a* of the pixel electrode 191 may be larger than an area of the upper electrode 191*b* in a plan view associated with the liquid crystal display. A pixel area of the liquid crystal display may include three regions (or three domains), some features of the three domains associated with FIG. 6 and FIG. 7 may be analogous to or identical to some of the above-discussed features of the three domains associated with FIG. 1, FIG. 2, and FIG. 3. The liquid crystal display associated with FIG. 6 may have one or more of the above-discussed advantages of the liquid crystal display associated with FIG. 1.

The first domain associated FIG. 6 and FIG. 7 may be relatively larger than the first domain associated with FIG. 1, FIG. 2, and FIG. 3. The second domain and third domain associated with FIG. 6 and FIG. 7 may be relatively smaller than the second domain and third domain associated with FIG. 1, FIG. 2, and FIG. 3. The substantially large first domain may enable optimal transmittance in the pixel area.

In an embodiment, transmittance of the liquid crystal display may be optimized by configuring the area of the plate portion of the lower electrode of the pixel electrode with reference to an area of the pixel area and/or with reference to an area of the upper electrode.

Figure 10:
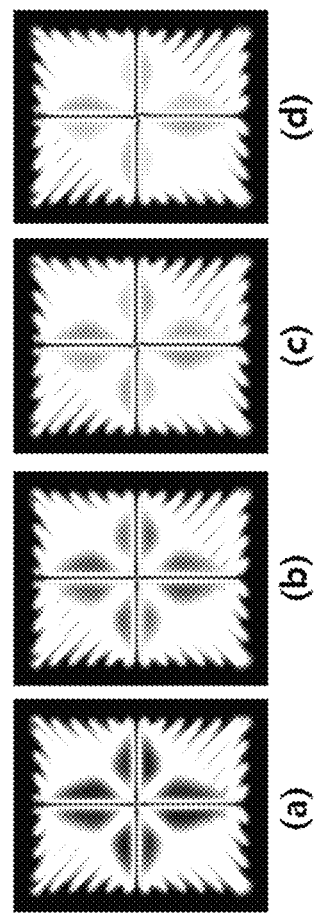
FIG. 10 to FIG. 12 illustrate results of experimental examples of the present invention.
Figure 11:
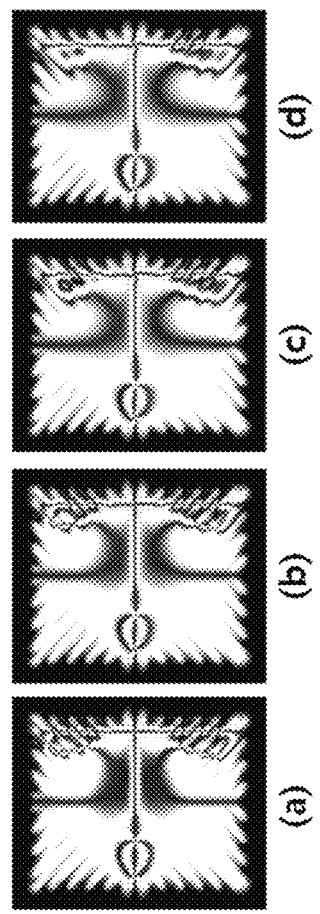
Figure 12:
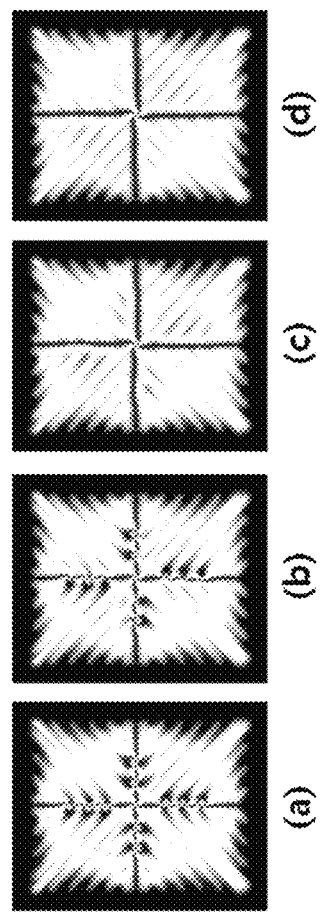

According to embodiments, the ratio of the area of the plate portion 192 of the lower electrode 191*a* of the pixel electrode 191 to the area of the pixel electrode 191 may be in a range of about 27% to about 58%. According to embodiments, the ratio of the area of the plate portion 192 of the lower electrode 191*a* of the pixel electrode 191 to the area of the pixel electrode 191 may be in a range of about 25% and about 60%. Hereinafter, experimental examples of the present invention will be described with reference to FIG. 10 to FIG. 12. FIG. 10 to FIG. 12 illustrate results of experimental examples of the present invention.

In the experimental examples, the variation of transmittance according to time was measured after the same voltage was applied to the pixel electrode and the common electrode in a first case in which the ratio of the area of the plate-shaped portion 192 of the lower electrode 191*a* of the pixel electrode 191 to the area of the pixel electrode 191 was 20% or less as in the conventional liquid crystal display, in a second case in which the ratio of the area of the plate-shaped portion 192 of the lower electrode 191*a* of the pixel electrode 191 to the area of the pixel electrode 191 was about 28% as in the liquid crystal display according to the exemplary embodiment described with reference to FIG. 1 to FIG. 5, and in a third case in which the ratio of the area of the plate-shaped portion 192 of the lower electrode 191*a* of the pixel electrode 191 to the area of the pixel electrode 191 was about 58% as in the liquid crystal display according to the exemplary embodiment described with reference to FIG. 6 to FIG. 9. These results are illustrated in FIG. 10 to FIG. 12. In FIG. 10 to FIG. 12, (a) indicates the result at 20 ms, (b) indicates the result at 40 ms, (c) indicates the result at 80 ms, and (d) indicates the result at 120 ms.

Referring to FIG. 10 to FIG. 12, it is seen that the liquid crystal molecules are regularly arranged at each domain and there are no liquid crystal molecules that irregularly move as in the conventional liquid crystal display, in the case of the liquid crystal displays according to the exemplary embodiments of the present invention. Further, it is seen that transmittance of the liquid crystal displays according to the exemplary embodiments of the present invention is increased as compared with the conventional liquid crystal display. Particularly, it is seen that the transmittance is increased at a region at which the plate-shaped portion 192 of the lower electrode 191*a* of the pixel electrode 191 is formed.

As such, in accordance with the liquid crystal display according to the present exemplary embodiment, it is possible to prevent display quality deterioration caused by misalignment between the lower display panel 100 and the upper display panel 200 by dividing one pixel area into a plurality of domains by using the branch electrodes 194 and 195 without forming domain dividers such as cutouts in the common electrode 270, and it is also possible to prevent transmittance deterioration of the liquid crystal display while accomplishing a plurality of domains by increasing the ratio of the plate-shaped portion of the lower electrode of the pixel electrode.

Figure 13:
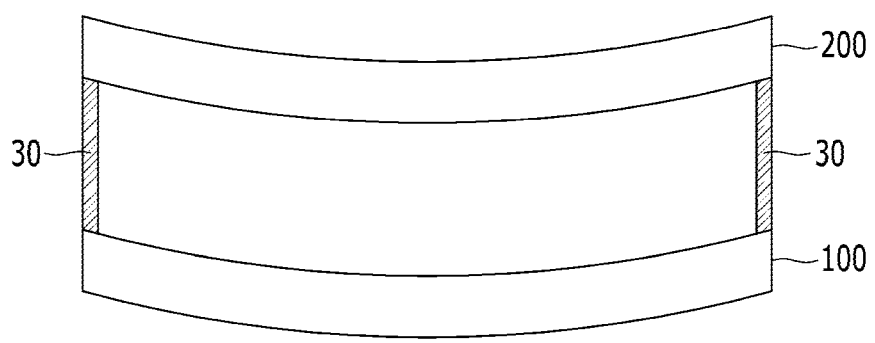
FIG. 13 is a schematic cross-sectional view illustrating elements and/or structures in a liquid crystal display according to an embodiment.

FIG. 13 is a schematic cross-sectional view illustrating elements and/or structures in a liquid crystal display according to an embodiment. Some features of the liquid crystal display associated with FIG. 13 may be analogous to or identical to some of the features discussed above with reference to FIG. 1, FIG. 2, FIG. 3, FIG. 4, FIG. 5, FIG. 6, FIG. 7, FIG. 8, and FIG. 9. Description related to analogous features and/or identical features may not be repeated.

Referring to FIG. 13, in the liquid crystal display, each of the lower panel 100 and the upper panel 200 may be curved. The two panels 100 and 200 are connected to (and/or attached to) each other through sealants 30.

In the liquid crystal display, each pixel area may provide three luminance levels. Advantageously, satisfactory image quality and/or a satisfactory viewing angle may be attained.

In the liquid crystal display, the common electrode may be continuous without significant holes or cutouts. Advantageously, even if misalignment occurs between the two panels 100 and 200 when curvatures of the panels 100 and 200 are formed, substantially consistent and/or satisfactory image quality may still be attained.

While some embodiments have been described as examples, possible embodiments are not limited to the described embodiments. Embodiments are intended to cover various modifications and equivalent arrangements within the spirit and scope defined by the appended claims.

What is claimed is:

1. A display device comprising:
  a common electrode;
  a first pixel electrode, which overlaps the common electrode, comprises a plate electrode, and comprises first-set branch electrodes that are directly connected to the plate electrode;
  a second pixel electrode, which is electrically connected to the first pixel electrode, partially overlaps the first pixel electrode, and is positioned between the first pixel electrode and the common electrode;
  an insulating layer positioned between the first pixel electrode and the second pixel electrode; and
  a liquid crystal layer positioned between the common electrode and a combination of the first pixel electrode and the second pixel electrode,
  wherein,
  in a plan view associated with the display device, a ratio of an area of the plate electrode to areas of the first pixel electrode and the second pixel electrode is in a range of about 25% to about 60%.

2. The display device of claim 1, wherein the first-set branch electrodes comprise first-group first-set branch electrodes and second-group first-set branch electrodes, wherein the first-group first-set branch electrodes are aligned with the second-group first-set branch electrodes in the plan view, wherein the first-group first-set branch electrodes are directly connected to a first side of the plate electrode, wherein the second-group first-set branch electrodes are directly connected to a second side of the plate electrode, and wherein the first side of the plate electrode is parallel to the second side of the plate electrode in the plan view.

3. The display device of claim 1, further comprising a transistor, wherein a drain electrode is electrically connected through the first pixel electrode to the second pixel electrode.

4. The display device of claim 1, wherein the second pixel electrode comprises a first stem electrode and a first second-set branch electrode, wherein the first stem electrode partially overlaps the plate electrode, wherein the first-second branch electrode is directly connected to the first stem electrode and is oriented at an acute angle with respect to the first stem electrode in the plan view, wherein a first portion of the first second-set branch electrode overlaps the plate electrode, and wherein a second portion of the first second-set branch electrode does not overlap the plate electrode in a direction perpendicular to the plate electrode.

5. The display device of claim 4, wherein the first-set branch electrodes do not overlap the second pixel electrode in the direction perpendicular to the plate electrode.

6. The display device of claim 4, wherein the second portion of the first second-set branch electrode is positioned at a hole surrounded by the plate electrode in the plan view.

7. The display device of claim 1, wherein the second pixel electrode comprises a protrusion, wherein the protrusion protrudes from a center portion of the first stem electrode and directly contacts the first pixel electrode through a contact hole of the insulating layer.

8. The display device of claim 7, wherein the first pixel electrode comprises a connecting bar, wherein the connecting bar is positioned between two holes of the first pixel electrode and is surrounded by the plate electrode.

9. The display device of claim 8, wherein each of the two holes of the first pixel electrode has an isosceles triangle shape.

10. The display device of claim 1, wherein a first portion of the plate electrode overlaps the second pixel electrode, wherein a second portion of the plate electrode does not overlap the second pixel electrode in a direction perpendicular to the plate electrode, and wherein the first-set branch electrodes do not overlap the second pixel electrode in the direction perpendicular to the plate electrode.

11. The display device of claim 10, wherein the second portion of the plate electrode surrounds the first portion of the plate electrode in the plan view.

12. A display device comprising:
  a common electrode;
  a first pixel electrode, which overlaps the common electrode;
  a second pixel electrode, which is electrically connected to the first pixel electrode and is positioned between the first pixel electrode and the common electrode, wherein a first portion of the second pixel electrode does not overlap the first pixel electrode in a direction perpendicular to the common electrode, wherein a second portion of the second pixel electrode overlaps a first portion of the first pixel electrode, and wherein a second portion of the first pixel electrode does not overlap the second pixel electrode in the direction perpendicular to the common electrode;
  an insulating layer positioned between the first pixel electrode and the second pixel electrode; and
  a liquid crystal layer positioned between the common electrode and a combination of the first pixel electrode and the second pixel electrode.

13. The display device of claim 12, wherein the second portion of the second pixel electrode surrounds the first portion of the second pixel electrode in a plan view associated with the display device.

14. The display device of claim 12, wherein the second portion of the first pixel electrode surrounds the first portion of the first pixel electrode in a plan view associated with the display device.

15. The display device of claim 12, wherein the first portion of the second pixel electrode is positioned at a hole of the first pixel electrode in a plan view associated with the display device, and wherein the hole is surrounded by the first portion of the first pixel electrode in the plan view.

16. The display device of claim 15, wherein the hole has an isosceles triangle shape in the plan view.

17. The display device of claim 12, wherein a protrusion of the second pixel electrode extends through a contact hole of the insulating layer and directly contacts a center portion of the first pixel electrode.

18. A display device comprising:
a common electrode;
a first pixel electrode, which overlaps the common electrode, comprises a plate electrode, and comprises a plurality of branch electrodes, wherein the plurality of branch electrodes comprises first-group branch electrodes, second-group branch electrodes, third-group branch electrodes, and fourth-group branch electrodes, wherein the first-group branch electrodes are directly connected to a first side of the plate electrode, wherein the second-group branch electrodes are directly connected to a second side of the plate electrode, wherein the third-group branch electrodes are directly connected to a third side of the plate electrode, and wherein the fourth-group branch electrodes are directly connected to a fourth side of the plate electrode;
a second pixel electrode, which is electrically connected to the first pixel electrode and is positioned between the first pixel electrode and the common electrode, wherein the plate electrode partially overlaps the second pixel electrode, and wherein the plurality of branch electrodes does not overlap the second pixel electrode in a direction perpendicular to the common electrode;
an insulating layer positioned between the first pixel electrode and the second pixel electrode; and
a liquid crystal layer positioned between the common electrode and a combination of the first pixel electrode and the second pixel electrode.

19. The display device of claim 18, wherein the second pixel electrode is positioned between the first-group branch electrodes and the third-group branch electrodes in a plan view associated with the display device, and wherein the second pixel electrode is positioned between the second-group branch electrodes and the fourth-group branch electrodes in the plan view.

20. The display device of claim 18, wherein the first side of the plate electrode is directly connected to a first end of a fifth side of the plate electrode, and wherein the second side of the plate electrode is directly connected to a second end of the fifth side of the plate electrode.

* * * * *